UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

PROCESS OF FORMING SHAPED PHENOLIC CONDENSATION PRODUCTS.

1,115,766. Specification of Letters Patent. Patented Nov. 3, 1914.

No Drawing. Original application filed August 26, 1910, Serial No. 579,131. Divided and this application filed May 13, 1911. Serial No. 626,949.

*To all whom it may concern:*

Be it known that I, JONAS W. AYLSWORTH, a citizen of the United States, and a resident of East Orange, in the county of Essex and State of New Jersey, have invented a certain new and useful Process of Forming Shaped Phenolic Condensation Products, of which the following is a description.

This application is a division of my co-pending application, Ser. No. 579,131, filed August 26, 1910, entitled Bearing composition and process of forming the same.

The above mentioned application relates to a process of forming shaped phenolic condensation products and also to a process for forming bearings, as a specific embodiment of the invention, and also as a new composition of matter, a bearing composition formed by my process.

In my application above referred to, I have claimed as a new composition of matter, the bearing composition formed by the invention and the process by which said product and similar products may be formed. In this present application, I will claim a process for forming shaped phenolic condensation products, which is not limited to the production of bearing compositions.

Referring to the bearing composition formed by my invention as described in my application above referred to, a lining for bearing boxes is produced which lining may be cast about a shaft, hardened by the application of a low temperature as from 200° to 230° F., into a mass having a high lubricating factor, and which will become infusible upon the completion of the hardening reaction of the ingredients thereof.

The composition, which as is stated in the above application above referred to, I prefer to use for bearings, comprises a fusible soluble condensation product of phenol and formaldehyde, anhydrous phenol, graphite, hexa-methylene-tetra-amin, with or without the addition of an organic anhydrid, such as stearic anhydrid for example, and a final product solvent element or plasticity agent, such as mono-nitro-naphthalene, or mono-chloro-naphthalene, or other substances performing the same function, such as are described in my application, Ser. No. 496,060, composition and process of manufacturing the same, filed May 14, 1909.

If desired, the organic acid anhydrid may be used as the final product solvent element alone, without the addition of another such element, as mono-nitro-naphthalene. If the organic acid anhydrid is used, and hexa-methylene-tetra-amin is used as the hardening agent for the mass, the ammonia evolved by the reaction between the hexa-methylene-tetra-amin and the phenol resin combines with the acid anhydrid to form an acid amid, as is set forth in my Patent No. 1,020,593, dated March 19, 1912. The acid anhydrid also serves to combine any water contained in the mass or evolved in the reaction and renders the same harmless, as stated in my said patent.

The materials are mixed as follows: The fusible condensation product or phenol resin is melted together with the phenol and the product solvent element, if the latter is used and when all the ingredients are melted and in solution, hexa-methylene-tetra-amin is added in a fine state of sub-division and the temperature maintained at from 200° to 230° F. and rapidly stirred until the hexa-methylene-tetra-amin dissolves. The graphite is then added and stirred into the mass which is then quickly poured into the bearing box. The bearing box should previously be heated to a temperature of from 230° to 250° F. and after pouring the liquid mass, the bearing is wrapped in a heat-insulating covering. In a few minutes, the material, being maintained at reacting temperature, will harden to a phenolic condensation product which is infusible, has very little contraction, and forms a close fitting bearing which is self-lubricating to a large extent and is unaffected by lubricating oils. Suitable proportions for this composition are: Phenol resin or fusible soluble phenolic condensation product as described, preferably anhydrous—100 parts; anhydrous phenol—15 to 30 parts; stearic anhydrid—5 to 10 parts; hexa-methylene-tetra-amin—13 to 28 parts; graphite—15 to 30 parts.

Other hardening agents having the methylene radical $CH_2$, such as tri-oxy-methylene, may be used in place of the hexa-methylene-tetra-amin. The phenol resin is preferably in completely anhydrous form, which result is attained as is explained in my application, Ser. No. 496,060, referred to, by heating the same for a sufficient period to a temperature of about 400° F.

It is obvious that the invention here described has many uses apart from the formation of bearings cast about a shaft in a bearing box.

Accordingly, the object of my invention as disclosed and claimed, in this present application, is the production of a process for forming shaped phenolic condensation products consisting in pouring into a hot mold a solution or liquid mixture of ingredients which react on application of sufficient heat to form an infusible insoluble phenolic condensation product, the solution or mixture being heated to reacting temperature when poured into the mold, the mold then being covered or otherwise insulated against the escape of heat and the final reaction permitted to take place within the mold without further attention. This process can be carried out by simply mixing the ingredients together in a suitable solution or fused mass containing the ingredients, which, when heated sufficiently will become thin enough to readily pour into the mold. In this aspect of my process, it is not necessary that graphite be present in the composition poured. The melted mass is poured into the mold before the reaction has ensued or before it has progressed sufficiently to render the mass non-fluid. The reaction then proceeds without addition of heat, it only being necessary to have the mixture and the mold sufficiently hot at the time of pouring and to prevent, as far as is practicable, the escape of heat from the composition and the mold during the reaction.

Having now described my invention what I claim as new and desire to protect by Letters Patent is:—

1. The process of forming a hard shaped phenolic condensation product, which consists in mixing together in liquid condition ingredients capable of reacting together on application of sufficient heat to form an insoluble, infusible phenolic condensation product, heating a mold to a temperature at least equal to the final hardening reaction temperature of said ingredients, heating the said liquid mixture of ingredients, pouring the same into the hot mold, insulating the mold to prevent or retard the escape of heat therefrom, permitting the said reaction to ensue and the said hard shaped phenolic condensation product to be formed accordingly, substantially as described.

2. The process of forming a hard shaped phenolic condensation product, which consists in melting a fusible, soluble phenol resin, dissolving therein a substance containing the methylene radical, capable of reacting with said phenol resin to form an infusible product, heating the solution to the temperature necessary for the said reaction, pouring the same into a hot mold before the mass has become infusible, insulating the mold to prevent the escape of heat and permitting the said reaction to ensue without the addition of further heat and the said hard shaped phenolic condensation product to be formed accordingly, substantially as described.

3. The process of forming a hard shaped phenolic condensation product, which consists in melting a fusible phenol resin, dissolving therein hexa-methylene-tetra-amin in amount sufficient, upon reaction between the two, to cause the formation of an infusible product, heating the solution to the temperature necessary for the said reaction, pouring the same into a hot mold before the mass has become infusible, insulating the mold to prevent the escape of heat, and permitting the said reaction to ensue without the addition of further heat and the said hard shaped phenolic condensation product to be formed accordingly, substantially as described.

This specification signed and witnessed this 10th day of May 1911.

JONAS W. AYLSWORTH.

Witnesses:
ANNA R. KLEHM,
CLARENCE CHURCHILL.